United States Patent [19]
Lease et al.

[11] Patent Number: 5,861,811
[45] Date of Patent: Jan. 19, 1999

[54] FLUID SENSOR

[76] Inventors: Benjamin N. Lease, 8245 Elm Hill Cir., Knoxville, Tenn. 37919; Lee Paul Dollison, 902 Cerritos Way, Apt. J., Louisville, Tenn. 37777

[21] Appl. No.: 832,560

[22] Filed: Apr. 2, 1997

Related U.S. Application Data

[60] Provisional application No. 60/014,673 Apr. 3, 1996.

[51] Int. Cl.⁶ .................................................. G08B 21/00
[52] U.S. Cl. ....................... 340/608; 340/620; 73/304 C; 73/304 R
[58] Field of Search ..................................... 340/618, 620; 73/304 C, 304 R; 324/665, 670, 678, 689

[56] References Cited

U.S. PATENT DOCUMENTS

| | | |
|---|---|---|
| 3,109,882 | 11/1963 | Maltby . |
| 3,262,032 | 7/1966 | Levine et al. . |
| 3,339,411 | 9/1967 | Riffie . |
| 3,827,300 | 8/1974 | Thaler . |
| 3,843,832 | 10/1974 | Petersen et al. . |
| 3,956,760 | 5/1976 | Edwards . |
| 4,038,871 | 8/1977 | Edwards . |
| 4,054,744 | 10/1977 | Beaman . |
| 4,056,978 | 11/1977 | Zimmermann ........................ 340/620 |
| 4,137,558 | 1/1979 | Beaman . |
| 4,170,135 | 10/1979 | Booman et al. . |
| 4,295,370 | 10/1981 | Bristol . |
| 4,412,270 | 10/1983 | Weitz, Jr. et al. . |
| 4,418,571 | 12/1983 | Asmundsson et al. . |
| 4,467,646 | 8/1984 | Berryman et al. . |
| 4,472,968 | 9/1984 | Coates . |
| 4,594,892 | 6/1986 | Asmundsson . |
| 4,689,991 | 9/1987 | Beckley et al. . |
| 4,730,489 | 3/1988 | Hoekstra . |
| 4,745,893 | 5/1988 | Atherton et al. . |
| 4,806,847 | 2/1989 | Atherton et al. ........................ 340/620 |
| 4,809,129 | 2/1989 | Hansen, III et al. . |
| 4,811,160 | 3/1989 | Fleckenstein . |
| 4,845,486 | 7/1989 | Knight et al. ........................... 340/620 |
| 4,879,902 | 11/1989 | Loniello . |
| 5,031,068 | 7/1991 | Hansen, III et al. . |
| 5,052,223 | 10/1991 | Regnault et al. . |
| 5,057,813 | 10/1991 | Sasaki et al. ........................... 340/620 |
| 5,138,880 | 8/1992 | Lee et al. . |
| 5,156,047 | 10/1992 | Tuma et al. ............................. 340/620 |
| 5,187,979 | 2/1993 | Edmark, III . |
| 5,446,444 | 8/1995 | Lease . |

FOREIGN PATENT DOCUMENTS

| | | |
|---|---|---|
| 2 331 004 | 3/1977 | France . |
| 2 331 004 | 6/1977 | France . |
| 892957 | 4/1962 | United Kingdom ................... 340/618 |
| 2 248 939 | 4/1992 | United Kingdom . |

*Primary Examiner*—Jeffery A. Hofsass
*Assistant Examiner*—Nina Tong
*Attorney, Agent, or Firm*—Terrence Martin; Sean Detweiler; Jules Jay Morris

[57] ABSTRACT

A fluid sensor (100) senses a level of fluid (20) in a receptacle (10). The fluid sensor comprises a detector assembly (200) for detecting fluid and comprises sensor circuitry. The detector assembly comprises a detector body (201) comprising an electrically insulative material and defining first and second surfaces (210, 220) in a predetermined spaced relation. The detector body defines a space (250) between the first and second surfaces and defines a port (255, 257) for allowing fluid to pass in the space between the first and second surfaces. The detector assembly also comprises first and second conductive layers (212, 222) deposited over at least a portion of the first and second surfaces of the detector body, respectively. The sensor circuitry is conductively coupled to at least one of the first and second conductive layers for generating an electrical signal based on whether fluid is present in the space between the first and second surfaces.

26 Claims, 5 Drawing Sheets

FLUID SENSOR

This application claims the benefit of the Apr. 3, 1996 filing date of U.S. Provisional Application No. 60/014,673.

TECHNICAL FIELD

The present invention relates generally to the field of sensors. More particularly, the present invention relates to the field of fluid sensors.

BACKGROUND ART

Various fluid sensors are known for sensing a level of fluid in a receptacle and providing an indication as to whether the fluid has reached a certain level.

One typical fluid level sensor is a float-type fluid level switch. Because this sensor has moving parts, however, the sensor is susceptible to spurious switching as a result of vibration in automotive applications, for example. Also, the metal contacts of this sensor are susceptible to wear, reducing the life of the sensor.

DISCLOSURE OF INVENTION

A fluid sensor comprises a detector assembly for detecting fluid and comprises sensor circuitry. The detector assembly comprises a detector body comprising an electrically insulative material and defining a first surface and a second surface in a predetermined spaced relation with the first surface. The detector body defines a space between the first surface and the second surface and defines a port for allowing fluid to pass in the space between the first and second surfaces. The detector assembly also comprises a first conductive layer deposited over at least a portion of the first surface of the detector body and a second conductive layer deposited over at least a portion of the second surface of the detector body. The sensor circuitry is conductively coupled to at least one of the first and second conductive layers for generating an electrical signal based on whether fluid is present in the space between the first and second surfaces.

A method for manufacturing a fluid sensor comprises the step of forming a detector body comprising an electrically insulative material and defining a first surface and a second surface in a predetermined spaced relation with the first surface. The detector body defines a space between the first surface and the second surface and defines a port for allowing fluid to pass into the space between the first and second surfaces. A first conductive layer is deposited over at least a portion of the first surface of the detector body, and a second conductive layer is deposited over at least a portion of the second surface of the detector body. Sensor circuitry is conductively coupled to at least one of the first and second conductive layers. The sensor circuitry generates an electrical signal based on whether fluid is present in the space between the first and second surfaces.

BRIEF DESCRIPTION OF DRAWINGS

The present invention is illustrated by way of example and not limitation in the figures of the accompanying drawings, in which like references indicate similar elements and in which.

MODE(S) FOR CARRYING OUT THE INVENTION

Figure 1:
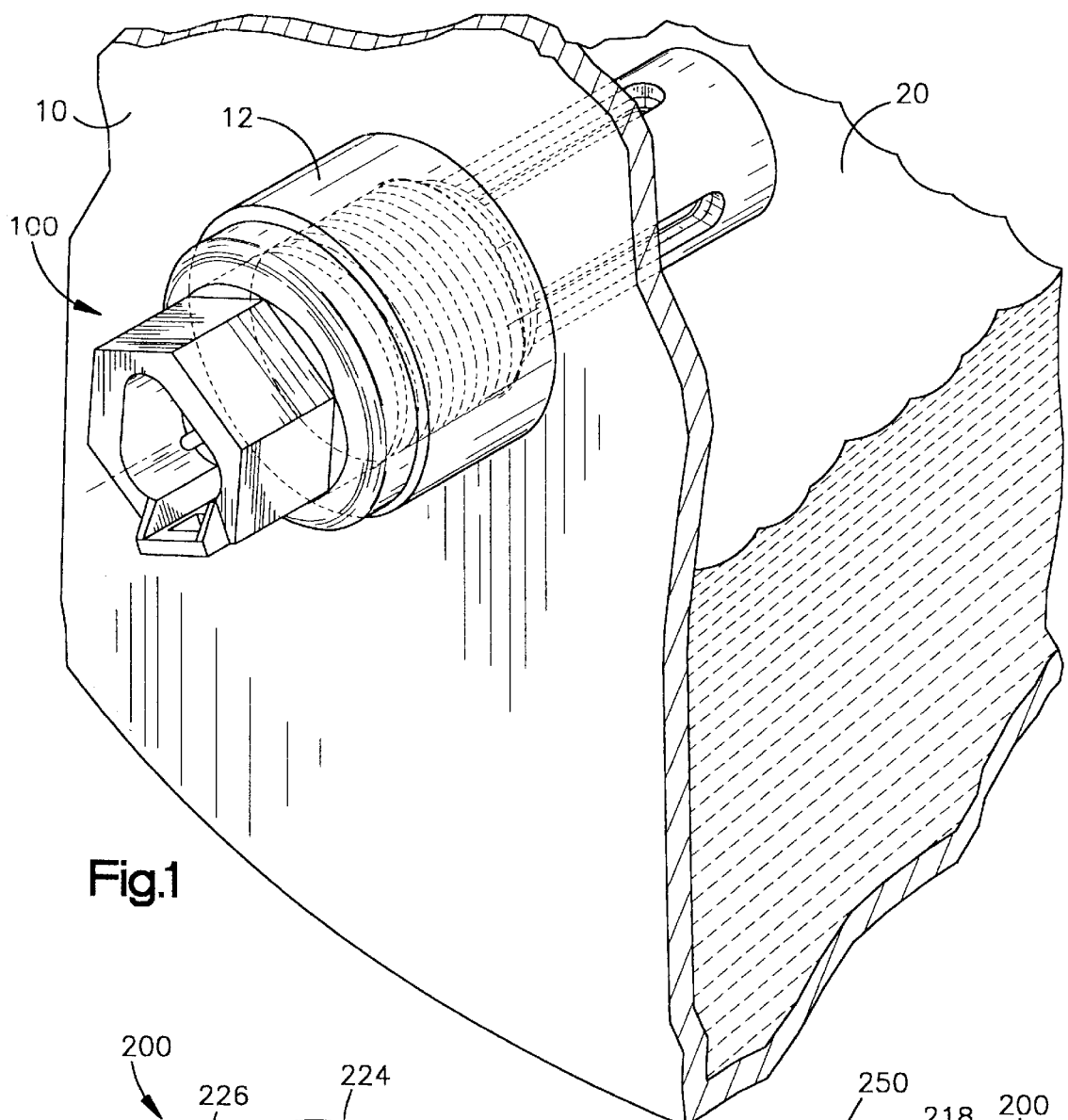
FIG. 1 illustrates a perspective view of a fluid sensor mounted to sense a level of a fluid in a receptacle.

FIG. 1 illustrates a fluid sensor 100 for sensing a level of a fluid 20 in a receptacle 10. The fluid sensor 100 may be configured to sense a level of any suitable fluid 20 in any suitable receptacle 10. The fluid sensor 100 may be used for recreational vehicle and automotive applications, for example. The fluid sensor 100 may be used for sensing in a reservoir tank a level of oil, hydraulic fluid, ethanol, water, or antifreeze, for example.

The fluid sensor 100 is mounted to the receptacle 10 such that the fluid sensor 100 extends in the receptacle 10 to detect or sense the presence of the fluid 20 when the fluid 20 reaches the level at which the fluid sensor 100 is positioned. The fluid sensor 100 generates an electrical fluid sensor output signal for output based on whether the fluid sensor 100 senses the fluid 20 at the level of the fluid sensor 100.

Figure 2:
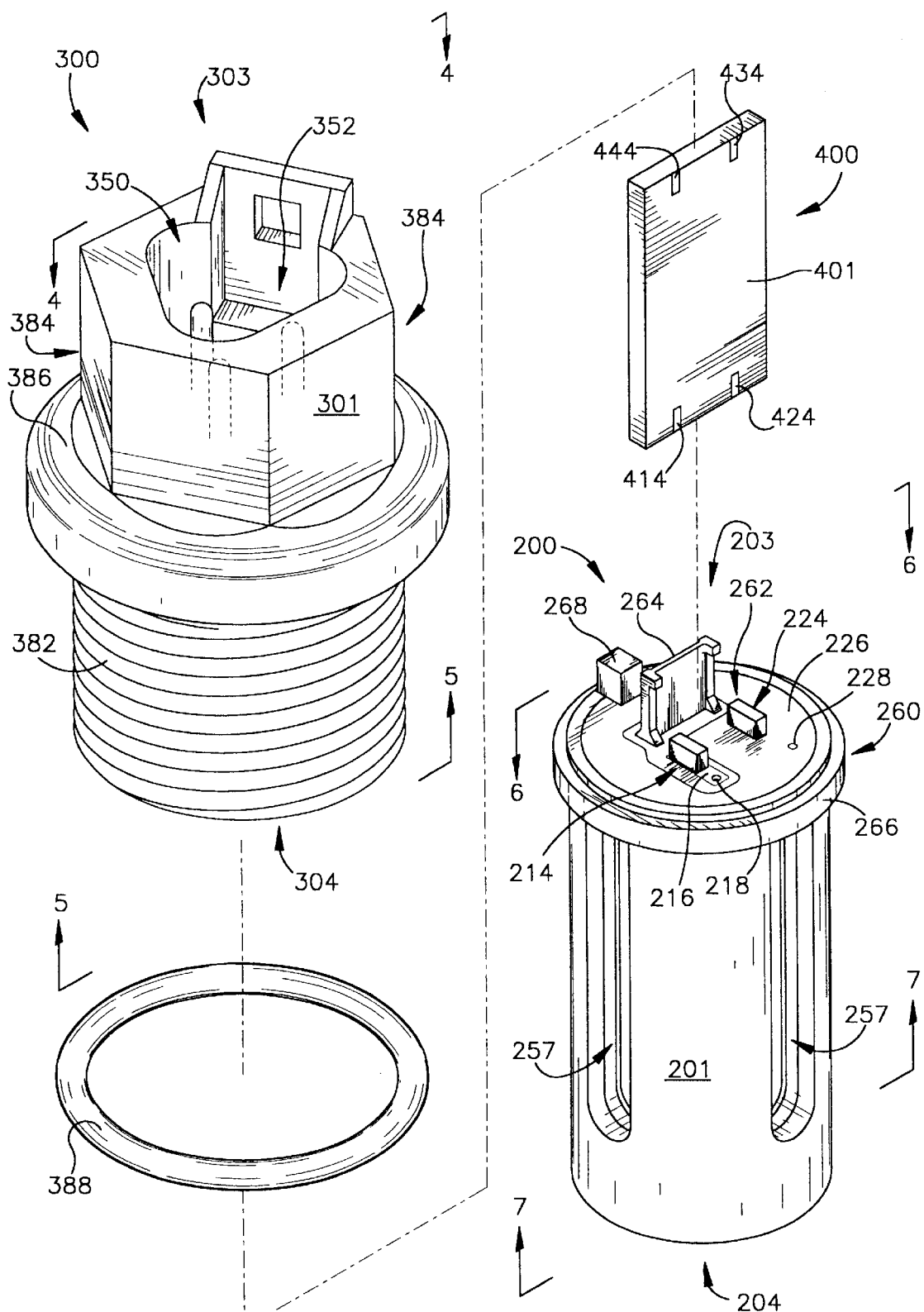
FIG. 2 illustrates an exploded, perspective view of the fluid sensor.
Figure 3:
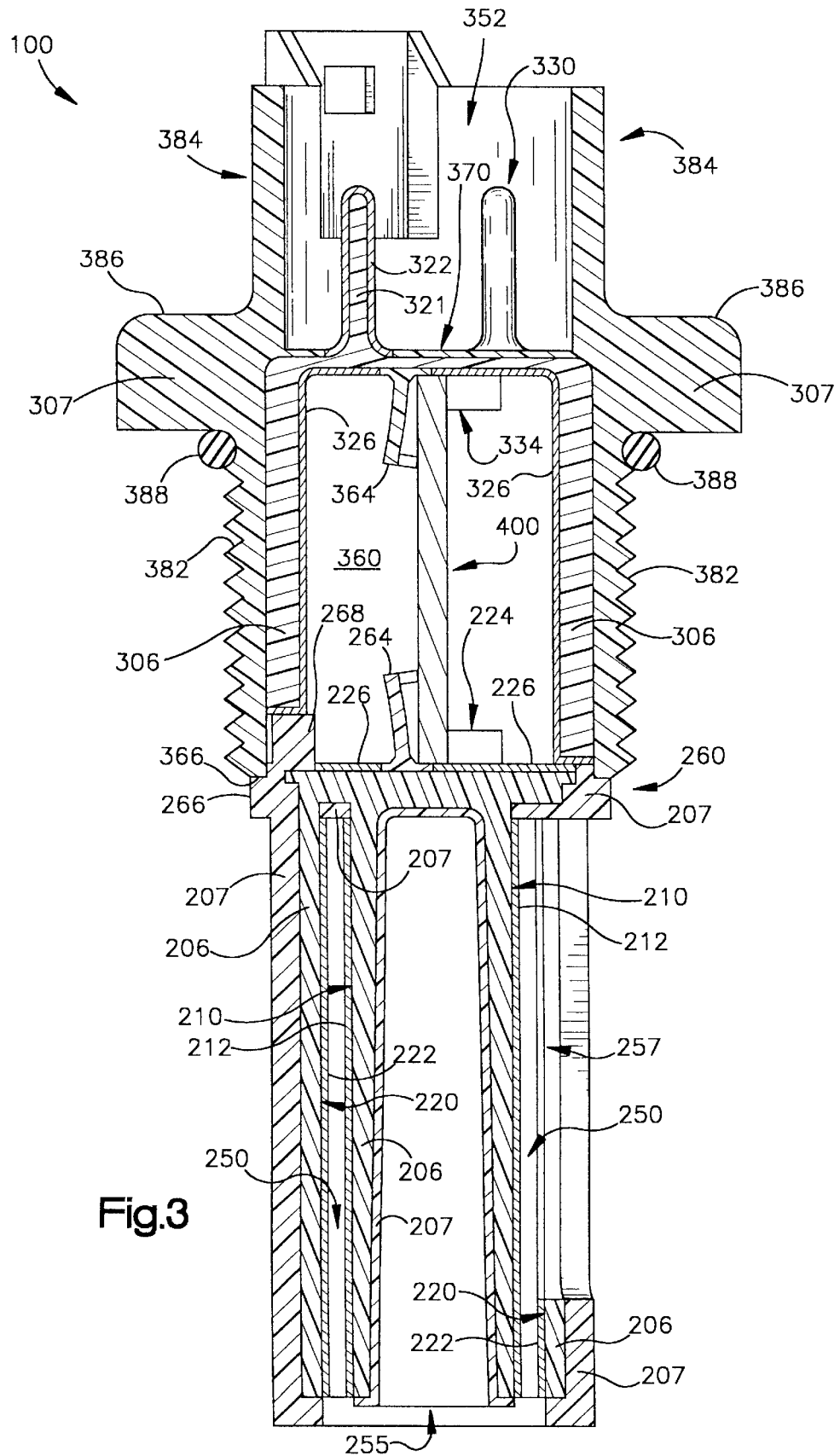
FIG. 3 illustrates a side, cross-sectional view of the fluid sensor.

Referring to FIGS. 2 and 3, the fluid sensor 100 comprises a detector assembly 200 for detecting fluid for the fluid sensor 100, a connector assembly 300 comprising an electrical connector 350, and a circuit assembly 400 for generating and outputting the electrical fluid sensor output signal to the electrical connector 350 based on whether fluid is detected with the detector assembly 200. The detector assembly 200 and the connector assembly 300 are configured to mate with one another to house the circuit assembly 400. The connector assembly 300 is also configured to help mount the fluid sensor 100 to the receptacle 10 such that the detector assembly 200 extends in the receptacle 10.

Figures 6, 7:
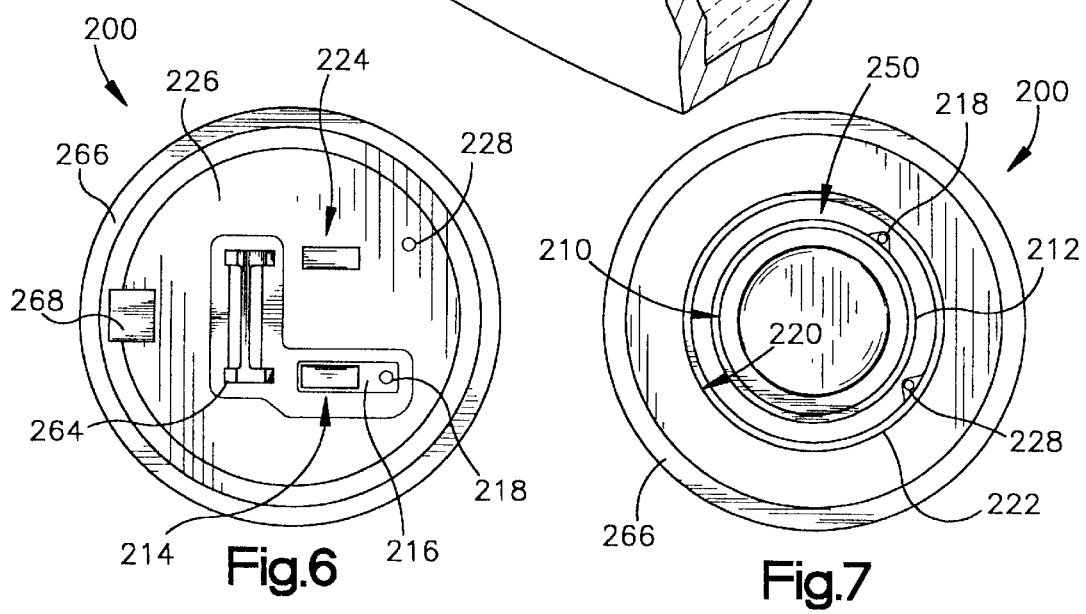
FIG. 6 illustrates a top view of a detector assembly for the fluid sensor as seen approximately from the plane indicated by the line 6—6 of FIG. 2.
FIG. 7 illustrates a bottom view of the detector assembly for the fluid sensor as seen approximately from the plane indicated by the line 7—7 of FIG. 2.

The detector assembly 200 comprises a detector body 201. The detector body 201 defines surfaces 210, 220 in a predetermined spaced relation. The detector body 201 defines a gap or space 250 between the spaced surfaces 210, 220. As illustrated in FIGS. 3 and 7, the detector body 201 for the illustrated embodiment defines the surfaces 210, 220 such that the surfaces 210, 220 themselves define the space 250. The detector body 201 defines the surface 220 such that the surface 220 surrounds at least a portion of the surface 210. As illustrated in FIGS. 2, 3, and 7, the detector body 201 for the illustrated embodiment defines the surface 210 as an inner, generally cylindrical surface and the surface 220 as an outer, generally cylindrical surface coaxial with the surface 210. The detector body 201 may be formed from any suitable material, such as an electrically insulative material for example.

The detector assembly 200 comprises conductive layers 212, 222. The conductive layer 212 is deposited over at least a portion of the surface 210 of the detector body 201, and the conductive layer 222 is deposited over at least a portion of the surface 220 of the detector body 201. The conductive layers 212, 222 may be formed from any suitable conductive material. The deposited conductive layers 212, 222 are spaced, conductive plates and form a capacitor for the detector assembly 200. The illustrated detector assembly 200 comprises a coaxial capacitor formed by the spaced, generally cylindrical conductive layers 212, 222, as illustrated in FIGS. 2, 3, and 7.

The detector body 201 defines ports 255, 257 to allow fluid to pass into and out from the space 250. As illustrated in FIGS. 3 and 7, the detector body 201 for the illustrated embodiment defines the port 255 to allow fluid to pass into and out from the space 250 at a distal end 204 of the detector body 201. The illustrated detector body 201 defines the port 257 to allow fluid to pass into and out from the space 250 through the surface 220. The illustrated port 257 is elongate and lengthwise generally extends between a proximal end 203 of the detector body 201 and the distal end 204 of the detector body 201. The detector body 201 for the illustrated embodiment defines four ports 257.

The detector assembly 200 comprises conductive contacts 214, 224. The detector body 201 defines a cap 260 having a mounting surface 262 at the proximal end 203 of the detector body 201 to support the contacts 214, 224. As illustrated in FIGS. 2 and 6, the mounting surface 262 for the illustrated embodiment is generally circular in shape.

The contact 214 comprises a conductive layer 216 deposited over at least a portion of a contact stud formed to extend from the mounting surface 262. The contact 224 comprises a conductive layer 226 deposited over at least a portion of another contact stud formed to extend from the mounting surface 262. The contact studs for the contacts 214, 224 may be formed from any suitable material, such as an electrically insulative material for example. As illustrated in FIGS. 2, 3, and 6, the contact studs for the contacts 214, 224 are block-shaped for the illustrated embodiment. The conductive layers 216, 226 may be formed from any suitable conductive material. The conductive layer 226 for the illustrated embodiment extends beyond the contact 224 to cover a relatively large area of the mounting surface 262, as illustrated in FIGS. 2, 3, and 6.

The detector body 201 defines vias 218, 228 extending between the mounting surface 262 and the conductive layers 212, 222, respectively. As illustrated in FIGS. 6 and 7, the vias 218, 228 for the illustrated embodiment extend between the mounting surface 262 and the space 250. The contacts 214, 224 are conductively coupled to the conductive layers 212, 222, respectively, through the vias 218, 228, respectively. The conductive layer 216 is conductively coupled to the conductive layer 212 by a conductive pathway through the via 218, and the conductive layer 226 is conductively coupled to the conductive layer 222 by a conductive pathway through the via 228.

The contacts 214, 224 form an electrical interface for the detector assembly 200. As illustrated in FIG. 2, the contacts 214, 224 are configured for electrical contact with conductive contact pads 414, 424, respectively, of the circuit assembly 400 for the illustrated embodiment when the circuit assembly 400 is mounted on the mounting surface 262.

The detector assembly 200 is configured to help mount the circuit assembly 400 on the mounting surface 262. The detector assembly 200 comprises a biasing structure 264 formed to extend from the mounting surface 262 to help mount the circuit assembly 400 against the contacts 214, 224. The biasing structure 264 may be flexed away from the contacts 214, 224 to mount the circuit assembly 400 and then released against the mounted circuit assembly 400 to bias the circuit assembly 400 against the contacts 214, 224. The biasing structure 264 may be formed from any suitable material, such as a plastic for example. As illustrated in FIGS. 2, 3, and 6, the biasing structure 264 for the illustrated embodiment is generally shaped as a cantilever beam.

The detector assembly 200 is configured to mate with the connector assembly 300. As illustrated in FIGS. 2, 3, and 6, the detector assembly 200 for the illustrated embodiment comprises a locating flange 266 around the outer perimeter of the cap 260 to help guide the connector assembly 300 in mating the connector assembly 300 with the detector assembly 200. The detector assembly 200 also comprises an alignment feature 268 to help align the radial orientation of the connector assembly 300 with respect to the detector assembly 200. As illustrated in FIGS. 2, 3, and 6, the alignment feature 268 for the illustrated embodiment is a block-shaped key formed to extend from the mounting surface 262.

The detector body 201 for the illustrated embodiment comprises molded body portions 206, 207, as illustrated in FIG. 3. The molded body portions 206, 207 are formed using a suitable two-shot molding process. For the first shot, the molded body portion 206 is formed from an electrically insulative material suitable to promote the formation of conductive layers 212, 216, 222, 226 in depositing conductive material over the molded body portion 206. The molded body portion 207 is then formed with an electrically insulative material suitable to inhibit collection of deposited conductive material over the molded body portion 207 in depositing conductive layers 212, 216, 222, 226.

The molded body portion 207 is formed around the molded body portion 206 and selectively covers or masks regions of the molded body portion 206 to define patterns for the conductive layers 212, 216, 222, 226. Conductive material may then be selectively deposited over the detector body 201 to form the conductive layers 212, 216, 222, 226 as the deposited conductive material collects over the regions of the molded body portion 206 exposed by the molded body portion 207.

As illustrated in FIGS. 2, 3, 6, and 7, the molded body portion 206 for the illustrated embodiment defines the surfaces 210, 212, the contact studs for the contacts 214, 224, and the vias 218, 228. The illustrated molded body portion 207 defines the biasing structure 264, the locating flange 266, and the alignment feature 268.

For one embodiment using an electroless plating operation to deposit the conductive layers 212, 216, 222, 226, the molded body portion 206 may be formed from a suitable plateable resin, and the molded body portion 207 may be formed from a suitable non-plateable resin. One suitable plateable resin is an approximately thirty percent glass-filled plastic resin, such as ULTEM® 2313 available from GE Plastics of General Electric for example, and one suitable non-plateable resin is an approximately twenty percent glass-filled plastic resin, such as ULTEM® 2212 available from GE Plastics of General Electric for example. A suitable conductive material may then be plated to a suitable thickness over the detector body 201, forming the conductive layers 212, 216, 222, 226 over the molded body portion 206 in accordance with the molded body portion 207. For one embodiment, approximately 0.0007 inches, for example, of copper (Cu) may be selectively plated over the detector body 201, and approximately 0.0002 inches, for example, of nickel (Ni) may be plated over the copper plating. The nickel plating serves as a barrier to help protect the copper plating from corrosion and helps promote electrical contact for the conductive layers 212, 216, 222, 226.

As conductive material is deposited to form the conductive layers 212, 216, 222, 226, the conductive pathways through the vias 218, 228 are formed on the inner walls of the vias 218, 228 with the deposited conductive material. The vias 218, 228 may then be filled with a suitable material, such as an epoxy for example, to help seal any remaining space in the vias 218, 228.

The connector assembly 300 comprises a connector body 301. The connector body 301 defines a plug receptacle 352, a circuitry receptacle 360, and a partition 370 dividing the plug receptacle 352 from the circuitry receptacle 360. As illustrated in FIGS. 2, 3, 4, and 5, the connector body 301 for the illustrated embodiment defines the mouth of the plug receptacle 352 at a proximal end 303 of the connector body 301 and defines the mouth of the circuitry receptacle 360 at a distal end 304 of the connector body 301. The connector body 301 may be formed from any suitable material, such as an electrically insulative material for example.

The connector assembly 300 comprises conductive pins 320, 330, 340 supported in the plug receptacle 352. The pin 320 comprises a conductive layer 322 deposited over at least a portion of a pin stud 321 formed to extend in the plug receptacle 352 from the partition 370. The pin 330 comprises a conductive layer 332 deposited over at least a portion of another pin stud formed to extend in the plug receptacle 352 from the partition 370. The pin 340 comprises a conductive layer 342 deposited over at least a portion of another pin stud formed to extend in the plug receptacle 352 from the partition 370. The pin studs, including the pin stud 321, may be formed from any suitable material, such as an electrically insulative material for example.

Figure 4:
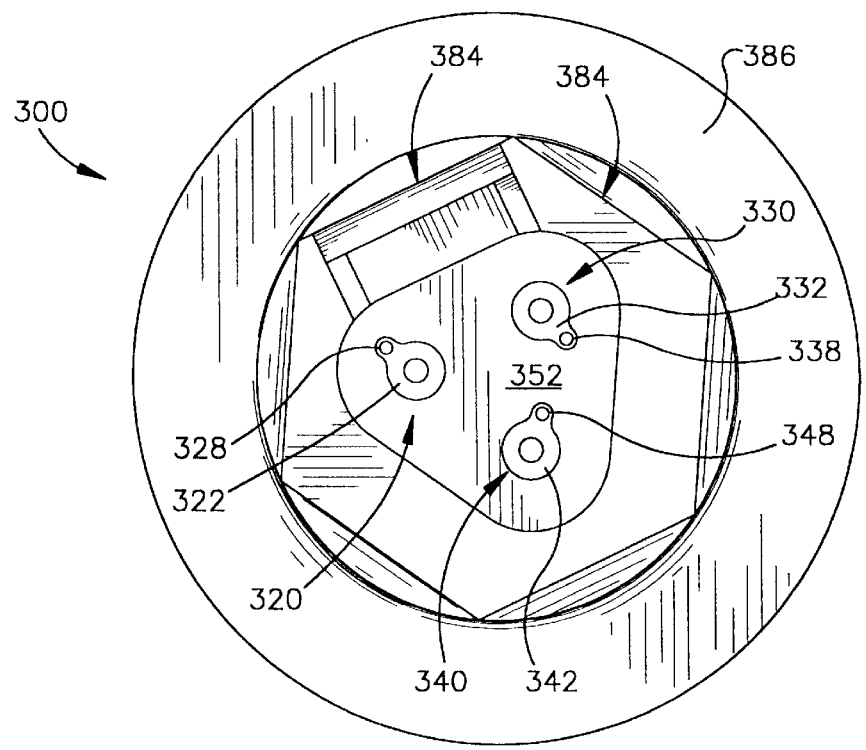
FIG. 4 illustrates a top view of a connector assembly for the fluid sensor as seen approximately from the plane indicated by the line 4—4 of FIG. 2.

The pins 320, 330, 340 in the plug receptacle 352 form the electrical connector 350 for the connector assembly 300. As illustrated in FIGS. 2, 3, and 4, the electrical connector 350 for the illustrated embodiment is a Deutsch DT-3Pin connector suitable for removable connection with a Deutsch DT06-3S connector. For the illustrated electrical connector 350, the pin 320 conducts a ground signal, the pin 330 conducts a power signal, and the pin 340 conducts the fluid sensor output signal.

Figure 5:
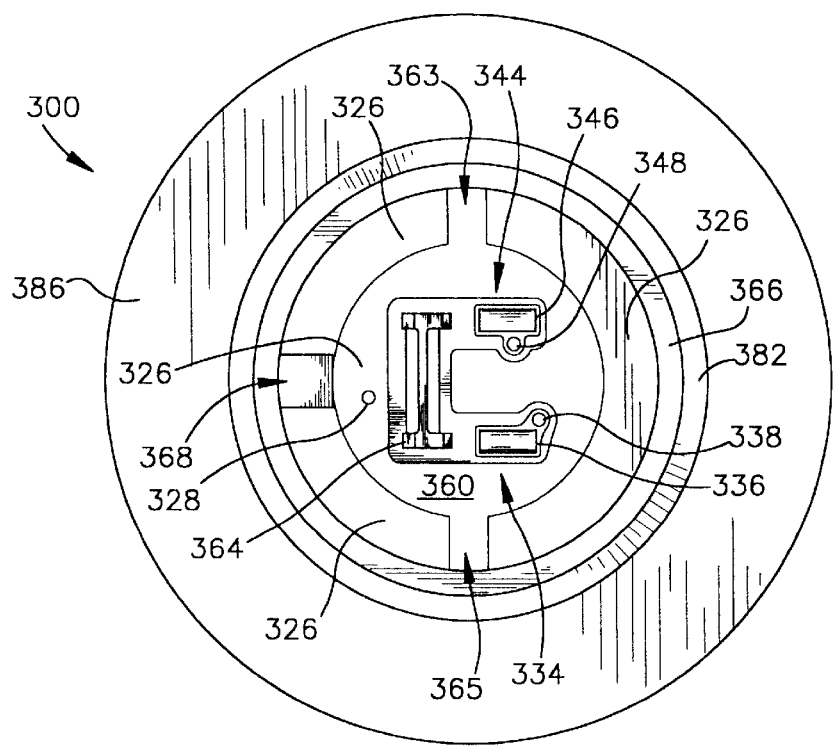
FIG. 5 illustrates a bottom view of the connector assembly for the fluid sensor as seen approximately from the plane indicated by the line 5—5 of FIG. 2.

The connector assembly 300 comprises a conductive layer 326. The conductive layer 326 may be formed from any suitable conductive material. The conductive layer 326 is deposited over at least a portion of an inner side of the circuitry receptacle 360. As illustrated in FIGS. 3 and 5, the conductive layer 326 for the illustrated embodiment covers a relatively large area of the inner sides or walls of the circuitry receptacle 360, including the partition 370. The illustrated conductive layer 326 extends outward over an edge at the mouth of the circuitry receptacle 360 to form a contact surface for conductive contact with the illustrated conductive layer 226 of the detector assembly 200 when the connector assembly 300 and the detector assembly 200 are mated.

The connector assembly 300 comprises conductive contacts 334, 344. The contact 334 comprises a conductive layer 336 deposited over at least a portion of a contact stud formed to extend in the circuitry receptacle 360 from the partition 370. The contact 344 comprises a conductive layer 346 deposited over at least a portion of another contact stud formed to extend in the circuitry receptacle 360 from the partition 370. The contact studs may be formed from any suitable material, such as an electrically insulative material for example. As illustrated in FIGS. 3 and 5, the contact studs for the contacts 334, 344 are block-shaped for the illustrated embodiment. The conductive layers 336, 346 may be formed from any suitable conductive material.

The connector body 301 defines vias 328, 338, 348 extending through the partition 370 between the plug receptacle 352 and the circuitry receptacle 360. The pin 320 is conductively coupled to the conductive layer 326 through the via 328, and the pins 330, 340 are conductively coupled to the contacts 334, 344, respectively, through the vias 338, 348, respectively. The conductive layer 322 is conductively coupled to the conductive layer 326 by a conductive pathway through the via 328. The conductive layer 332 is conductively coupled to the conductive layer 336 by a conductive pathway through the via 338. The conductive layer 342 is conductively coupled to the conductive layer 346 by a conductive pathway through the via 348.

The contacts 334, 344 form an electrical interface for the connector assembly 300. As illustrated in FIGS. 2 and 3, the contacts 334, 344 are configured for electrical contact with conductive contact pads 434, 444, respectively, of the circuit assembly 400 for the illustrated embodiment when the circuit assembly 400 is mounted in the circuitry receptacle 360.

The connector assembly 300 is configured to help mount the circuit assembly 400 in the circuitry receptacle 360. As illustrated in FIG. 5, the connector body 301 for the illustrated embodiment defines slots 363, 365 along opposing sides or walls of the circuitry receptacle 360 for positioning the circuit assembly 400 for suitable contact with the contacts 334, 344 and for fixing the circuit assembly 400 in the circuitry receptacle 360. The connector assembly 300 comprises a biasing structure 364 formed to extend in the circuitry receptacle 360 from the partition 370 to help mount the circuit assembly 400 against the contacts 334, 344. The biasing structure 364 may be flexed away from the contacts 334, 344 to mount the circuit assembly 400 and then released against the mounted circuit assembly 400 to bias the circuit assembly 400 against the contacts 334, 344. The biasing structure 364 may be formed from any suitable material, such as a plastic for example. As illustrated in FIGS. 3 and 5, the biasing structure 364 for the illustrated embodiment is generally shaped as a cantilever beam.

The connector assembly 300 is configured to mate with the detector assembly 200. The mouth of the circuitry receptacle 360 is configured to mate with the mounting surface 262 of the detector assembly 200. As illustrated in FIGS. 3 and 5, the connector body 301 for the illustrated embodiment defines at the mouth of the circuitry receptacle 360 a protruding rim 366 configured to surround the mounting surface 262 and rest on the locating flange 266 of the detector assembly 200. The illustrated conductive layer 326 contacts the illustrated conductive layer 226 of the detector assembly 200 when the connector assembly 300 and the detector assembly 200 are mated.

The connector body 301 is also configured with an alignment feature 368 for mating with the alignment feature 268 of the detector assembly 200 to help align the contacts 214, 224, 334, 344 for suitable contact with the circuit assembly 400. As illustrated in FIGS. 3 and 5, the alignment feature 368 for the illustrated embodiment is a socket formed in an inner side or wall of the circuitry receptacle 360 for mating with the block-shaped alignment key 268 of the detector assembly 200.

In mating the connector assembly 300 with the detector assembly 200, the circuitry receptacle 360 and the mounting surface 262 form a housing to house the circuit assembly 400. The connector assembly 300 is secured to the detector assembly 200 to form the fluid sensor 100. For one embodiment, the rim 366 is ultrasonically welded to the cap 260 to help provide a hermetic seal for the circuit assembly 400 housed in the fluid sensor 100.

The connector assembly 300 is configured to help mount the fluid sensor 100 to the receptacle 10 such that the detector assembly 200 extends in the receptacle 10. As illustrated in FIGS. 1, 2, and 3, the connector body 301 for the illustrated embodiment defines threads 382 around the outer perimeter of the connector body 301 toward the distal end 304 of the connector body 301. The detector assembly 200 may be inserted through an opening in a wall of the receptacle 10, and the illustrated connector assembly 300 may be screwed in a suitable socket 12 to mount the fluid sensor 100 to the receptacle 10 as illustrated in FIG. 1.

As illustrated in FIGS. 1, 2, 3, and 4, the connector body 301 for the illustrated embodiment defines a hexagonal interface 384 around the outer perimeter of the connector body 301 toward the proximal end 303 of the connector body 301 to allow for use of a tool in screwing the fluid sensor 100 in the socket 12. The illustrated connector body 301 also defines a flange 386 around the outer perimeter of the connector body 301 between the hexagonal interface 384 and the threads 382. The illustrated connector assembly 300 comprises an O-ring 388 mounted to surround the outer perimeter of the connector body 301 between the flange 386 and the threads 382 to help seal the opening in the socket 12. The O-ring 388 may be formed from any suitable material, such as fluorosilicone for example.

The connector body 301 for the illustrated embodiment comprises molded body portions 306, 307, as illustrated in FIG. 3. The molded body portions 306, 307 are formed using a suitable two-shot molding process. For the first shot, the molded body portion 306 is formed from an electrically insulative material suitable to promote the formation of conductive layers 322, 326, 332, 336, 342, 346 in depositing conductive material over the molded body portion 306. The molded body portion 307 is then formed with an electrically insulative material suitable to inhibit collection of deposited conductive material over the molded body portion 307 in depositing conductive layers 322, 326, 332, 336, 342, 346.

The molded body portion 307 is formed around the molded body portion 306 and selectively covers or masks regions of the molded body portion 306 to define patterns for the conductive layers 322, 326, 332, 336, 342, 346. Conductive material may then be selectively deposited over the connector body 301 to form the conductive layers 322, 326, 332, 336, 342, 346 as the deposited conductive material collects over the regions of the molded body portion 306 exposed by the molded body portion 307.

As illustrated in FIGS. 2, 3, 4, and 5, the molded body portion 306 for the illustrated embodiment defines the pin studs for the pins 320, 330, 340, the contact studs for the contacts 334, 344, the vias 328, 338, 348, the circuitry receptacle 360, the slots 363, 365, and the alignment feature 368. The illustrated molded body portion 307 defines the plug receptacle 352, the biasing structure 364, the rim 366, the threads 382, the hexagonal interface 384, and the flange 386.

For one embodiment using an electroless plating operation to deposit the conductive layers 322, 326, 332, 336, 342, 346, the molded body portion 306 may be formed from a suitable plateable resin, and the molded body portion 307 may be formed from a suitable non-plateable resin. One suitable plateable resin is an approximately thirty percent glass-filled plastic resin, such as ULTEM® 2313 available from GE Plastics of General Electric for example, and one suitable non-plateable resin is an approximately twenty percent glass-filled plastic resin, such as ULTEM® 2212 available from GE Plastics of General Electric for example. A suitable conductive material may then be plated to a suitable thickness over the connector body 301, forming the conductive layers 322, 326, 332, 336, 342, 346 over the molded body portion 306 in accordance with the molded body portion 307. For one embodiment, approximately 0.0007 inches, for example, of copper (Cu) may be selectively plated over the connector body 301, and approximately 0.0002 inches, for example, of nickel (Ni) may be plated over the copper plating to form the conductive layers 322, 326, 332, 336, 342, 346. The nickel plating serves as a barrier to help protect the copper plating from corrosion and helps promote electrical contact for the conductive layers 322, 326, 332, 336, 342, 346.

As conductive material is deposited to form the conductive layers 322, 326, 332, 336, 342, 346, the conductive pathways through the vias 328, 338, 348 are formed on the inner walls of the vias 328, 338, 348 with the deposited conductive material. The vias 328, 338, 348 may then be filled with a suitable material, such as an epoxy for example, to help seal any remaining space in the vias 328, 338, 348.

The circuit assembly 400 comprises sensor circuitry conductively coupled to at least one of the conductive layers 212, 222 of the detector assembly 200 for determining whether fluid is present in the space 250 between the conductive layers 212, 222. The sensor circuitry is conductively coupled to the connector assembly 300 to generate and output the electrical fluid sensor output signal to the electrical connector 350 based on whether the presence of fluid is detected with the detector assembly 200.

Because the presence of fluid in the space 250 displaces the air in the space 250 and increases the permittivity of the dielectric for the capacitor of the detector assembly 200, the presence of fluid in the space 250 increases the capacitance of the detector assembly 200. The sensor circuitry monitors the capacitance of the detector assembly 200 and determines fluid is present in the space 250 if the capacitance of the detector assembly 200 exceeds a predetermined threshold capacitance. The predetermined threshold capacitance for the sensor circuitry depends on the capacitance of the capacitor for the detector assembly 200 as determined, for example, by the particular fluid to be detected with the detector assembly 200, by the distance between the conductive layers 212, 222, and by the surface area of the conductive layers 212, 222.

The circuit assembly 400 comprises a printed circuit board 401 for supporting the sensor circuitry and the conductive contact pads 414, 424, 434, 444. As illustrated in FIGS. 2 and 3, the contact pads 414, 424, 434, 444 for the illustrated embodiment are positioned on the printed circuit board 401 for suitable contact with the contacts 214, 224, 334, 344 when the circuit assembly 400 is mounted in the circuitry receptacle 360 and on the mounting surface 262.

The illustrated circuit assembly 400 is powered by the power signal conducted through the pin 330, the contact 334, and the contact pad 434 and is grounded by the ground signal conducted through the pin 320, the conductive layer 326, the conductive layer 226, the contact 224, and the contact pad 424. The grounded conductive layers 226, 326 for the illustrated embodiment help shield the circuit assembly 400 from electromagnetic interference (EMI).

The illustrated circuit assembly 400 is conductively coupled to the conductive layer 212 through the contact 214 and the contact pad 414 to monitor a detector capacitance voltage signal of the detector assembly 200. The conductive layer 222 for the illustrated embodiment is grounded by the ground signal conducted through the pin 320, the conductive layer 326, and the conductive layer 226. Based on whether fluid is detected with the detector assembly 200, as determined by the monitored detector capacitance voltage signal, the illustrated circuit assembly 400 generates and outputs the electrical fluid sensor output signal to the pin 340 of the electrical connector 350 through the contact pad 444 and the contact 344.

Figure 8:
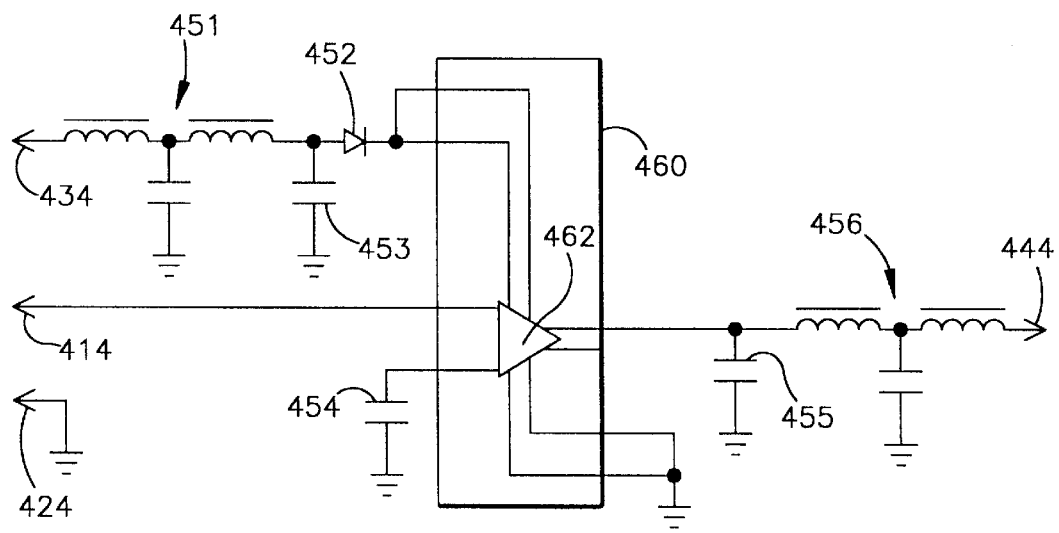
FIG. 8 illustrates a schematic diagram of sensor circuitry for the fluid sensor.
Figure 9:
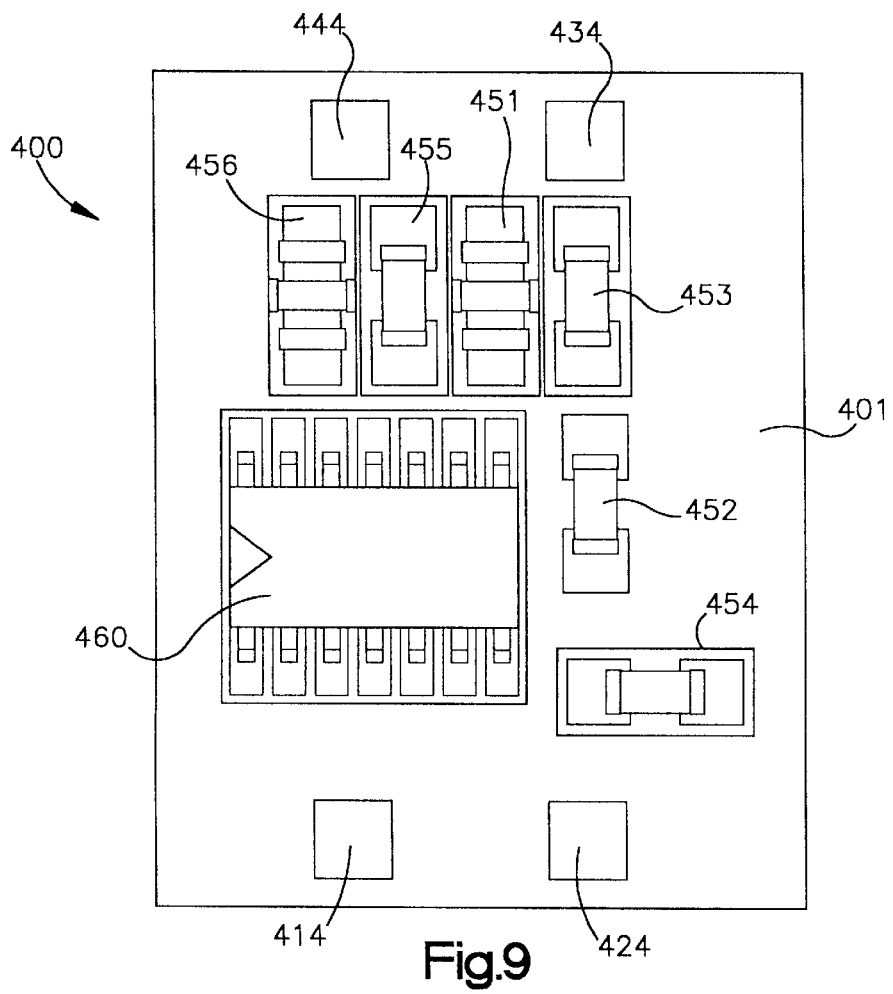
FIG. 9 illustrates a circuit assembly comprising the sensor circuitry for the fluid sensor.

As illustrated in FIG. 8, the sensor circuitry of the circuit assembly 400 for the illustrated embodiment comprises T-filters 451, 456, a diode 452, capacitors 453, 455, a reference capacitor 454, and a capacitive threshold detector application specific integrated circuit (CTD-ASIC) 460. FIG. 9 illustrates one arrangement of the electrical devices 451–456, 460 on the printed circuit board 401 of the circuit assembly 400 for the illustrated embodiment. Circuitry for one embodiment of the CTD-ASIC 460 is disclosed in U.S. Pat. No. 5,446,444 to Benjamin N. Lease.

For the illustrated sensor circuitry, the CTD-ASIC 460 is grounded by the ground signal conducted through the contact pad 424 and is powered by an approximately +5 volt signal conducted through the contact pad 434. The contact pad 434 is coupled to the anode of the diode 452 through the T-filter 451, and the cathode of the diode 452 is coupled to power the CTD-ASIC 460. The T-filter 451 helps filter radiated and conducted electromagnetic interference (EMI). The capacitor 453 is coupled between the anode of the diode 452 and ground.

The reference capacitor 454 is coupled between the CTD-ASIC 460 and ground. The capacitor formed by the conductive layers 212, 222 of the detector assembly 200 is also coupled between the CTD-ASIC 460 and ground as the conductive layer 212 is coupled to the CTD-ASIC 460 through the contact pad 414 and the conductive layer 222 is grounded.

The CTD-ASIC 460 generates and outputs the fluid sensor output signal through the T-filter 456 to the contact pad 444. The T-filter 451 helps filter radiated and conducted electromagnetic interference (EMI). The capacitor 455 is coupled between the output signal terminal of the CTD-ASIC 460 and ground.

To determine whether fluid is present in the space 250 of the detector assembly 200, the CTD-ASIC 460 simultaneously charges the reference capacitor 454 and the capacitor of the detector assembly 200. The CTD-ASIC 460 monitors the voltage potential across the reference capacitor 454 and across the conductive layers 212, 222 as a function of time with an operational amplifier (op-amp) 462 configured as a differential amplifier. The non-inverting input of the op-amp 462 is coupled to the reference capacitor 454, and the inverting input of the op-amp 462 is coupled to the conductive layer 212 of the capacitor for the detector assembly 200.

If the CTD-ASIC 460 determines the voltage potential across the reference capacitor 454 increases at a faster rate than that across the capacitor of the detector assembly 200, indicating the capacitor of the detector assembly 200 has a higher capacitance, the CTD-ASIC 460 outputs an approximately +5 volt signal to the contact pad 444 to indicate the presence of fluid is detected with the detector assembly 200. If the CTD-ASIC 460 otherwise determines the voltage potential across the capacitor of the detector assembly 200 increases at a faster rate than that across the reference capacitor 454, indicating the reference capacitor 454 has a higher capacitance, the CTD-ASIC 460 outputs an approximately zero volt signal to the contact pad 444.

For the sensor circuitry of the illustrated circuit assembly 400, suitable T-filters 451, 456 are available, for example, as Part No. ACF321825-332 from TDK of Japan, and suitable capacitors 453, 455 have a capacitance of approximately 0.1 $\mu$F, for example. A suitable reference capacitor 454 for the illustrated sensor circuitry depends, for example, on the particular fluid to be detected with the detector assembly 200, on the distance between the conductive layers 212, 222, and on the surface area of the conductive layers 212, 222.

For one embodiment, the illustrated detector assembly 200 defines the surfaces 210, 220 such that the illustrated conductive layers 212, 222 have a length of approximately 1.500 inches and have respective diameters of approximately 0.46 inch and approximately 0.58 inch, and the illustrated detector assembly 200 defines each of the four illustrated slots 257 with a width of approximately 0.125 inch and a length of approximately 1.25 inches.

For this embodiment of the detector assembly 200 to detect a fluid having a relative dielectric in the range of approximately 1.7 to approximately 4.0, such as for oil or hydraulic fluid for example, a suitable reference capacitor 454 has a capacitance of approximately 15 pF, for example. For this embodiment of the detector assembly 200 to detect a fluid having a relative dielectric in the range of approximately 12 to approximately 35, such as for ethanol for example, a suitable reference capacitor 454 has a capacitance of approximately 91 pF, for example. For this embodiment of the detector assembly 200 to detect a fluid having a relative dielectric in the range of approximately 34 to approximately 90, such as for water or antifreeze for example, a suitable reference capacitor 454 has a capacitance of approximately 240 pF, for example.

To help prevent forming a short or a relatively low resistive path between the conductive layers 212, 222 in detecting a relatively high conductive fluid with the detector assembly 200, a relatively thin electrically insulative layer may be formed over the conductive layers 212, 222 of the detector assembly 200 for other embodiments.

Because the fluid sensor 100 uses solid-state circuitry to determine whether fluid is detected with the detector assembly 200, the fluid sensor 100 overcomes disadvantages attendant to float-type fluid level switches. As one example, the fluid sensor 100 is suitable for automotive applications as the fluid sensor 100 reliably switches despite vibration. Furthermore, the life of the fluid sensor 100 is not limited by any mechanical wear.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A fluid sensor comprising:
   a) a detector assembly for detecting fluid, said detector assembly comprising:
      i) a detector body comprising an electrically insulative material and defining a first surface and a second surface in a predetermined spaced relation with said first surface, said detector body defining a space between said first surface and said second surface and defining a port for allowing fluid to pass into said space between said first and second surfaces, ii) a first conductive layer deposited over at least a portion of said first surface of said detector body, and iii) a second conductive layer deposited over at least a portion of said second surface of said detector body;

wherein said detector body comprises a first molded portion and a second molded portion around said first molded portion to define patterns for said first and second conductive layers, said first and second molded portions comprising different materials; and b) a printed circuit board for supporting sensor circuitry conductively coupled to at least one of said first and second conductive layers for generating an electrical signal based on whether fluid is present in said space between said first and second surfaces;

wherein said detector body further defines a mounting surface for supporting for electrical contact to said sensor circuitry and defines a via extending between said mounting surface and one of said first and second conductive layers, said contact conductively coupled to said one of said first and second conductive layers through said via.

2. The fluid sensor of claim 1, wherein said first surface surrounds at least a portion of said second surface.

3. The fluid sensor of claim 2, wherein said first surface is an inner, generally cylindrical surface and said second surface is an outer, generally cylindrical surface coaxial with said first surface.

4. The fluid sensor of claim 1, wherein said contact comprises a conductive layer deposited over a contact stud extending from said mounting surface; and wherein said detector assembly further comprises a biasing structure extending from said mounting surface of said detector body for mounting said printed circuit board against said contact.

5. The fluid sensor of claim 1, further comprising a connector assembly coupled to said detector assembly for mounting said fluid sensor to a receptacle such that said detector assembly extends in said receptacle to detect a level of fluid in said receptacle.

6. The fluid sensor of claim 1, further comprising:

c) a connector assembly coupled to said detector assembly, said connector assembly comprising:

i) a connector body defining a plug receptacle for an electrical connector, a circuitry receptacle for housing said printed circuit board, a partition dividing said plug receptacle from said circuitry receptacle, and a via extending through said partition between said plug receptacle and said circuitry receptacle, and ii) another contact for electrical contact to said sensor circuitry, said other contact conductively coupled to said electrical connector through said via.

7. The fluid sensor of claim 6, wherein said electrical connector comprises a pin, said pin comprising a conductive layer deposited over a pin stud extending in said plug receptacle from said partition.

8. The fluid sensor of claim 6, wherein said other contact comprises a conductive layer deposited over a contact stud extending in said circuitry receptacle from said partition; and wherein said connector assembly further comprises a biasing structure extending in said circuitry receptacle from said partition for mounting said printed circuit board against said other contact.

9. The fluid sensor of claim 1, further comprising a connector assembly coupled to said detector assembly, said connector assembly comprising a connector body defining a circuitry receptacle for housing said printed circuit board.

10. The fluid sensor of claim 9, wherein said connector body defines said circuitry receptacle with a mouth configured to mate with said mounting surface such that said circuitry receptacle and said mounting surface form a housing for said printed circuit board.

11. The fluid sensor of claim 9, further comprising a conductive layer deposited over at least a portion of an inner side of said circuitry receptacle for shielding electromagnetic interference.

12. The fluid sensor of claim 9, wherein said connector body defines slots along opposing sides of said circuitry receptacle for mounting said printed circuit board in said circuitry receptacle.

13. A method for manufacturing a fluid sensor comprising the steps of:

a) forming a detector body comprising an electrically insulative material and defining a first surface and a second surface in a predetermined spaced relation with said first surface, said detector body defining a space between said first surface and said second surface and defining a port for allowing fluid to pass into said space between said first and second surfaces;

b) depositing a first conductive layer over at least a portion of said first surface of said detector body;

c) depositing a second conductive layer over at least a portion of said second surface of said detector body; and d) conductively coupling sensor circuitry supported by a printed circuit board to at least one of said first and second conductive layers, said sensor circuitry for generating an electrical signal based on whether fluid is present in said space between said first and second surfaces;

wherein said forming step (a) comprises the steps of molding a first portion of said detector body and molding a second portion of said detector body around said first molded portion to define patterns for said first and second conductive layers, said first and second molded portions comprising different materials; and wherein the method further comprises the step of forming a contact on a mounting surface of said detector body for electrical contact to said sensor circuitry, said contact conductively coupled to one of said first and second conductive layers through a via extending between said mounting surface and said one of said first and second conductive layers.

14. The method of claim 13, wherein said depositing step (b) comprises the step of plating said first conductive layer with an electroless plating operation.

15. The method of claim 13, wherein said forming step (a) comprises the step of forming said detector body such that said first surface surrounds at least a portion of said second surface.

16. The method of claim 15, wherein said forming step (a) comprises the step of forming said detector body such that said first surface is an inner, generally cylindrical surface and said second surface is an outer, generally cylindrical surface coaxial with said first surface.

17. The method of claim 13, wherein said contact forming step comprises the step of depositing a conductive layer over a contact stud extending from said mounting surface, and wherein said conductively coupling step (d) comprises the step of mounting said printed circuit board against said contact with a biasing structure extending from said mounting surface of said detector body.

18. The method of claim 13, further comprising the step of forming a connector assembly for mounting said fluid sensor to a receptacle such that said detector body extends in said receptacle to detect a level of fluid in said receptacle.

19. The method of claim 13, further comprising the steps of:

forming a connector body defining a plug receptacle for an electrical connector, a circuitry receptacle for housing said printed circuit board, a partition dividing said plug receptacle from said circuitry receptacle, and a via extending through said partition between said plug receptacle and said circuitry receptacle;

forming another contact for electrical contact to said sensor circuitry, said other contact conductively coupled to said electrical connector through said via;

housing said printed circuit board in said circuitry receptacle and conductively coupling said sensor circuitry to said other contact; and securing said connector body to said detector body.

20. The method of claim 19, further comprising the step of forming a pin of said electrical connector by depositing a conductive layer over a pin stud extending in said plug receptacle from said partition.

21. The method of claim 19, wherein said other contact forming step comprises the step of depositing a conductive layer over a contact stud extending in said circuitry receptacle from said partition, and wherein said housing step comprises the step of mounting said printed circuit board against said other contact with a biasing structure extending in said circuitry receptacle from said partition.

22. The method of claim 13, further comprising the steps of:

forming a connector body defining a circuitry receptacle;

housing said printed circuit board in said circuitry receptacle; and securing said connector body to said detector body.

23. The method of claim 22, wherein said securing step comprises the step of mating a mouth of said circuitry receptacle with said mounting surface of said detector body such that said circuitry receptacle and said mounting surface form a housing for said printed circuit board.

24. The method of claim 22, further comprising the step of depositing a conductive layer over at least a portion of an inner side of said circuitry receptacle for shielding electromagnetic interference.

25. The method of claim 22, wherein said housing step comprises the step of mounting said printed circuit board in said circuitry receptacle with slots defined along opposing sides of said circuitry receptacle.

26. The method of claim 22, wherein said securing step comprises the step of ultrasonically welding said connector body to said detector body.

* * * * *